(12) United States Patent
Koehler

(10) Patent No.: US 10,048,381 B2
(45) Date of Patent: Aug. 14, 2018

(54) OPTO-ELECTRONIC DETECTION DEVICE AND METHOD FOR SENSING THE SURROUNDINGS OF A MOTOR VEHICLE BY SCANNING

(71) Applicant: VALEO Schalter und Sensoren GmbH, Bietigheim-Bissingen (DE)

(72) Inventor: Michael Koehler, Hamburg (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 242 days.

(21) Appl. No.: 14/903,828

(22) PCT Filed: Jun. 30, 2014

(86) PCT No.: PCT/EP2014/063817
§ 371 (c)(1),
(2) Date: Jan. 8, 2016

(87) PCT Pub. No.: WO2015/007506
PCT Pub. Date: Jan. 22, 2015

(65) Prior Publication Data
US 2016/0146940 A1    May 26, 2016

(30) Foreign Application Priority Data
Jul. 16, 2013   (DE) .......... 10 2013 011 853

(51) Int. Cl.
*G01C 3/08* (2006.01)
*G01S 17/93* (2006.01)
(Continued)

(52) U.S. Cl.
CPC .......... *G01S 17/936* (2013.01); *G01S 7/4816* (2013.01); *G01S 7/4817* (2013.01); *G01S 17/42* (2013.01); *G02B 26/101* (2013.01)

(58) Field of Classification Search
CPC ...... G01S 17/42; G01S 17/936; G01S 7/4816; G01S 7/4817; G02B 26/101
(Continued)

(56) References Cited

U.S. PATENT DOCUMENTS 6,400,448 B1 * 6/2002 Sugawara ............... G01S 7/483
                                                  180/169
6,657,705 B2 * 12/2003 Sano ........................ G01C 3/08
                                                  180/167
(Continued)

FOREIGN PATENT DOCUMENTS

EP        1 403 657 A1    3/2004
WO        98/16801 A1     4/1998

OTHER PUBLICATIONS

International Search Report issued in PCT/EP2014/063817 dated Oct. 16, 2014 (2 pages).

*Primary Examiner* — Mark Hellner
(74) *Attorney, Agent, or Firm* — Osha Liang LLP

(57) ABSTRACT

The invention relates to a scanning opto-electronic detection device and a method for sensing the surroundings of a motor vehicle 1 by scanning by means of an opto-electronic detection device 2. The detection device 2 comprises a transmission and reception optical system 4 that outputs electromagnetic rays and maps reflected rays on a detector, wherein the detector is of multiline design and comprises a plurality of detector cells for providing electrical received signals on the basis of received reflected rays, which detector cells are lined up in a detector cell stack and are evaluable in parallel measurement planes. The detection device furthermore comprises a mirror carrier 7 having mirror faces 9, 10 that are averted from one another and that are arranged in a manner tilted at a tilt angle with respect to an axis of rotation 8 of the mirror carrier 7 and map different vertical sensing regions for reflected rays onto the detector.

(Continued)

Figure 1:
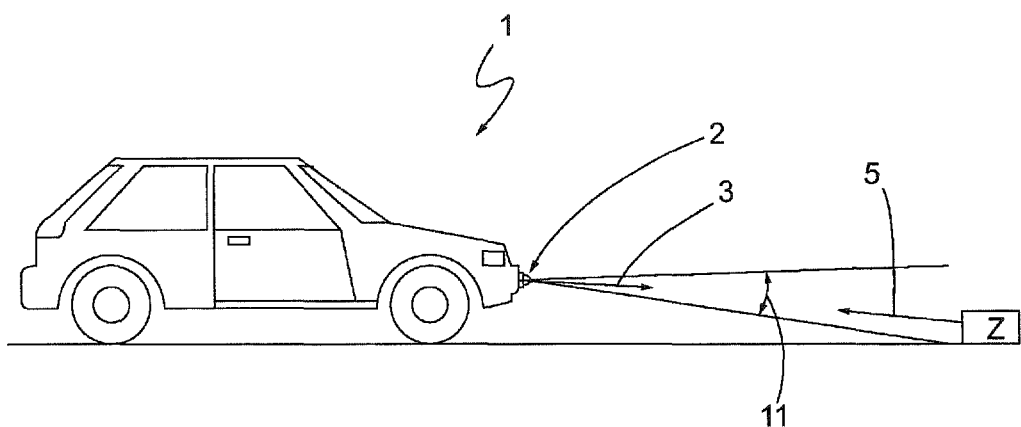

In order to allow the surroundings of a motor vehicle to be sensed with little physical outlay by means of an opto-electronic detection device having as large a sensing region as possible, the invention provides for determined tilt angles α of the mirror faces 9, 10 that are such that the sensing regions 14', 14" intersect in a central section of a total sensing region 16.

8 Claims, 3 Drawing Sheets

(51) Int. Cl.
  *G01S 17/42* (2006.01)
  *G01S 7/481* (2006.01)
  *G02B 26/10* (2006.01)
(58) Field of Classification Search
  USPC .......................................................... 356/5.01
  See application file for complete search history.

(56) References Cited

U.S. PATENT DOCUMENTS

| | | |
|---|---|---|
| 2005/0219506 A1 | 10/2005 | Okuda et al. |
| 2014/0009747 A1* | 1/2014 | Suzuki .................. G01S 17/02 356/4.01 |

* cited by examiner

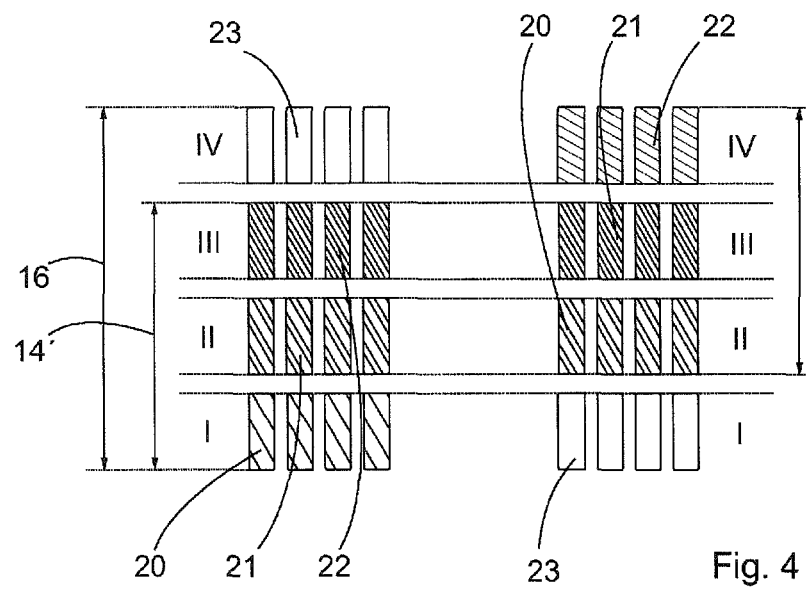
Fig. 4
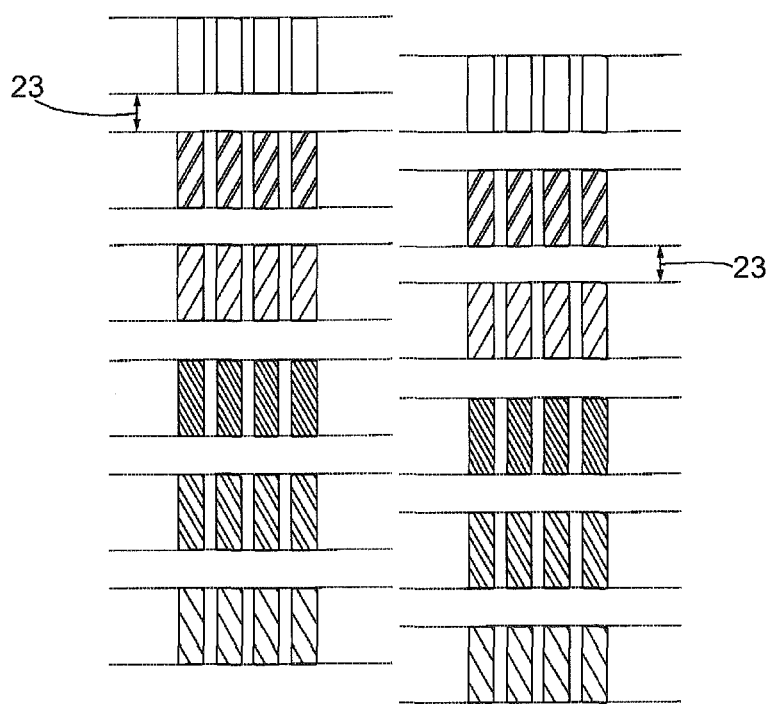
Fig. 5

OPTO-ELECTRONIC DETECTION DEVICE AND METHOD FOR SENSING THE SURROUNDINGS OF A MOTOR VEHICLE BY SCANNING

The invention relates to a scanning opto-electronic detection device, particularly a laser scanner, for a motor vehicle, according to the preamble of Claim 1. The invention additionally relates to a method for sensing the surroundings of a motor vehicle by scanning by means of an opto-electronic detection device, particularly a laser scanner, according to the preamble of Claim 6.

In the automotive sector, a wide variety of driving assistance systems are increasingly used, that is to say electronic supplementary devices for assisting the driver in particular driving situations. In this context, various driving assistance systems having safety and convenience functions based on panoramic view sensors are known, for example adaptive speed regulators, collision avoidance systems, parking aids, lane departure warning assistants, etc. In this context, laser-based measuring apparatuses for motor vehicles are known by the name "Lidar" ("Light detection and ranging"), which are used particularly for optical distance and speed measurement and allow identification of objects at a relatively long range from the motor vehicle. In this case, a transmission and reception optical system outputs electromagnetic rays and maps reflection rays, that is to say rays that are reflected from a target object in the surroundings of the motor vehicle, onto a detector. On the basis of the received reflection rays, electrical received signals are provided, which are usually analysed in an evaluation device. If echoes, or pulses, are identified in the received signal, they can be attributed to reflections of the transmitted laser impulse from target objects in the surroundings. By means of evaluation of the phase shift or, in particular, measurement of the echo time, information about the sensed object is ascertained. The period of time between transmission of the laser impulse and reception of the echo is proportional to the distance from the object. Laser scanners comprise a rotating mirror carrier that is moved in steps, with scanning sensing taking place in each angle step and in this way the surroundings being scanned. In this case, there is both lateral and vertical resolution. Mechanical scanning using a transmission and reception optical system, and also a rotating mirror for ray deflection, allows a fine angle resolution.

Laser scanners are known whose detector comprises a plurality of detector cells that are often lined up perpendicular to an optical axis of the transmission and reception optical system. The respective received signals of the detector cells are evaluated in parallel measurement planes, so that there is multiline scanning. Within the radiation sector, it is firstly possible to evaluate structures close to the ground in a low measurement plane and secondly possible to ascertain information about the target objects in the upper measurement planes, or lines.

A known laser scanner called "Ibeo LUX" affords a vertical field of view corresponding to a sector of 3.2° through the use of a multiline detector having four detector cells. In this case, the detector cells are lined up in a detector cell stack, so that the respective received signals can be associated with parallel measurement planes within the sensing region. The known laser scanner comprises two laser diodes as optical transmitters, which each illuminate two of the four detector cells. The use of a plurality of light-emitting diodes exposes the detector cells in sufficiently quick sequence in order to achieve a high scanning rate. Specifically in the case of typical short-range applications, such as collision warnings and pedestrian protection, high scanning rates are desired in order to ensure the relevant detection quality. The boundary of the vertical field of view is a disadvantage of the known laser scanner, however, since in principle a vertical field of view that is as large as possible is desirable. For some applications, the limited field of view of the known laser is not sufficient.

In order to provide a larger vertical field of view, a further known laser scanner called "Ibeo LUX 8L" has additional detector cells. Furthermore, the two mirror faces of the mirror carrier that can be driven in rotation that are averted from one another are arranged at a tilt angle in relation to the axis of rotation, which means that the mirror faces deflect rays in different directions. In the case of the known laser scanner, the tilted mirror carrier is arranged at a tilt angle that is such that one mirror face scans a sensing region below the optical axis of the transmission and reception optical system and maps onto one portion of the detector cells and the other mirror face captures a sensing region above the optical axis and maps onto the other portion of the available detector cells. The tilted arrangement of the mirror faces with double the number of detector cells means that the known laser scanner manages to double the number of measurement planes and hence the vertical field of view in comparison with a mirror face that is situated perpendicular to the optical axis of the transmission and reception optical system. In this case, a total sensing region is compiled from the sensing region of one mirror face above the optical axis and the sensing region of the other mirror face. However, the large number of detector cells results in a low scanning rate, which means that a plurality of light sources are required.

Although the known laser scanner achieves a large total sensing sector, by merging the respective sensing sectors of two mirror faces, it is necessary to embrace enormous design complexity, and hence corresponding production costs. In addition, the extension of the vertical visual range comes at the expense of a decrease in, namely halving of, the effective scanning rate (scanning frequency).

The present invention is based on the object of allowing inexpensive sensing of the surroundings of a motor vehicle by scanning by means of an opto-electronic detection device given the lowest possible design complexity.

The invention achieves this object by means of a scanning opto-electronic detection device having the features of Claim 1. The object is furthermore achieved by a method for sensing the surroundings of a motor vehicle by scanning by means of an opto-electronic detection device having the features of Claim 6.

According to the invention, in an opto-electronic detection device having a rotating mirror carrier for deflecting the transmitted and received rays, the mirror faces are arranged or set at a tilt angle with respect to the axis of rotation that is such that the sensing regions of the detector, which are projected differently by the tilted mirror faces, intersect, that is to say cover one another in sections or partially, rather than completely, overlap. In this case, the sensing region of the detector cell stack is that vertical range in which the detector cell stack is projected via the transmission and reception optical system and the mirror faces of the rotating mirror carrier into the surroundings that are to be surveyed. On account of the tilted arrangement of the mirror faces, the detector cell stack is projected from the mirror faces into sensing regions that are offset from one another and intersect.

The detector therefore has, in conjunction with each of the mirror faces, a sensing region that is situated differently in each case. The transmission and reception optical system is in this case aligned such that the transmitted ray is mapped at infinity on the map of the detector cell stack projected into infinity. When evaluating the received signals of the detector cells, it is then possible, by taking account of the tilt angle of the mirror faces, to associate the received signals in parallel measurement planes with a different situation in the sensing regions, which are brought together by an appropriate evaluation algorithm to form a total sensing region. In this case, it becomes possible—depending on how many detector cells are associated with both sensing regions—to extend the sensing region according to the height of the detector cell stack by means of additional virtual measurement planes.

Since each mirror face deflects rays at a corresponding tilt angle with respect to the axis of rotation and covers a particular sensing region, the sensing regions with the tilt angle according to the invention intersect such that at least one measurement plane is situated in the sensing region of the subsequent or preceding scanning process. The invention is based on the insight that the sensing region of a detector cell stack can be extended to form a larger total sensing region for a simultaneously high scanning rate in particular ranges, namely those that overlap, when single detector cells are used for both sensing regions, namely in the overlapping ranges. The invention produces an optimum compromise for the practical demands on a detection device, namely firstly providing as large a total sensing region as possible and secondly also attaining as high a scanning rate as possible, particularly in important sensing regions for particular driving assistance applications. This also involves few components being used and hence cost savings being attained.

In a central section of the total sensing region of the detection device according to the invention, a high scanning rate is achieved, since this section of the total sensing region is scanned by both mirror faces. In this way, the central section, which is particularly important for short-range applications, is operated at a high scanning rate. With a small number of detectors, even rays reflected in the marginal sections of the total sensing region, that is to say in the marginal sections situated outside the range of intersection, are captured and hence target objects are detected.

In one advantageous embodiment of the invention, both mirror faces are arranged or set at a particular tilt angle, for example 0.1° to 10°, with respect to the axis of rotation of the mirror carrier, the common central section of both sensing regions being able to be set precisely. The tilt angles of the mirror faces may be different in this case and are at any rate coordinated such that the intersection of the sensing regions, according to the invention, via the respective mirror faces is ensured.

Particularly advantageously, the mirror faces are situated parallel, wherein the mirror carrier is arranged at a tilt angle with respect to its axis of rotation. In this embodiment, both mirror faces are arranged at the same tilt angle, a mirror carrier that is comparatively simple to produce and having parallel mirror faces being sufficient to produce the detection device, particularly a laser scanner, in accordance with the invention and being positioned at the tilt angle according to the invention. During revolution of the mirror carrier, different vertical sensing regions are alternately scanned with the detector cells that are present. Advantageously, the mirror faces are arranged at angles of tilt that are such that the sensing regions of the respective mirror faces are produced on at least one common detector cell. A few detector cells, which therefore ensure a high power balance and hence long range, can sense or scan a large total sensing region in this case.

By way of example, in the case of a detection device having three physically present detector cells, the mapping of the sensing regions onto two common detector cells of the total sensing region can be augmented by a further measurement plane. In this case, according to the invention, the received signals of the detector cells are each assigned, during the scanning processes of both mirror faces, to virtual measurement planes at a height that is dependent on the tilt angle, the virtual measurement planes of two successive scanning processes being merged or projected onto the total sensing region in coplanar fashion. This is preferably effected as part of evaluation of the received signals by means of appropriately set-up evaluation electronics. In an exemplary embodiment with three detector cells, of which two detector cells are associated with both sensing regions, it is possible for four virtual measurement planes to be set up and evaluated by taking account of the tilt angles, as a result of which the total sensing region of the detector with three detector cells is extended by approximately one third given constant design complexity. The geometric reception range of a detector in conjunction with the transmission and reception optical system of, by way of example, 2.4° that can be achieved with a few detector cells and a single light source is extended to approximately 3.2° by the invention.

In one advantageous embodiment of the invention, the received signals of the detector cells are in this case assigned to respective sensing regions of the respectively active mirror face, which means that measurement planes in different sensing regions can be evaluated by taking account of the respective tilt angles of the mirror faces.

A large vertical total sensing region of the detection device is ensured, according to one embodiment of the invention, if the detector cells are arranged at intervals from one another to form intermediate spaces, wherein the mirror faces are arranged at a tilt angle that is such that each mirror face maps the detector cells in the intermediate spaces of the mapping of the respective other mirror faces. In this embodiment of the invention, large total sensing regions of the detection device are possible with low design complexity and, in particular, a few detector cells in the detector cell stack, since the detector cells are arranged at vertical intervals and the vertical gaps in the respective sensing region of a mirror face are closed by means of appropriate tilting of the mirror carrier at a particular tilt angle by the scanning process of the respective other mirror face.

Depending on how many detector cells are associated with both sensing regions or come under the projected sensing region of both mirror faces, additional extension of the sensing region according to the height of the detector cell stack is possible as a result of additional virtual measurement planes.

The invention increases the vertical sensing region without altering the power balance of the detection device. In comparison with the known detection device having mirror faces that are situated parallel to the axis of rotation of the mirror carrier and therefore always map both mirror faces onto all the detector cells, a high scanning rate for the same power balance is ensured in a central section of the total sensing region, with the marginal regions, in which a reduced scanning rate is regularly sufficient, being substantially extended.

Figure 2:
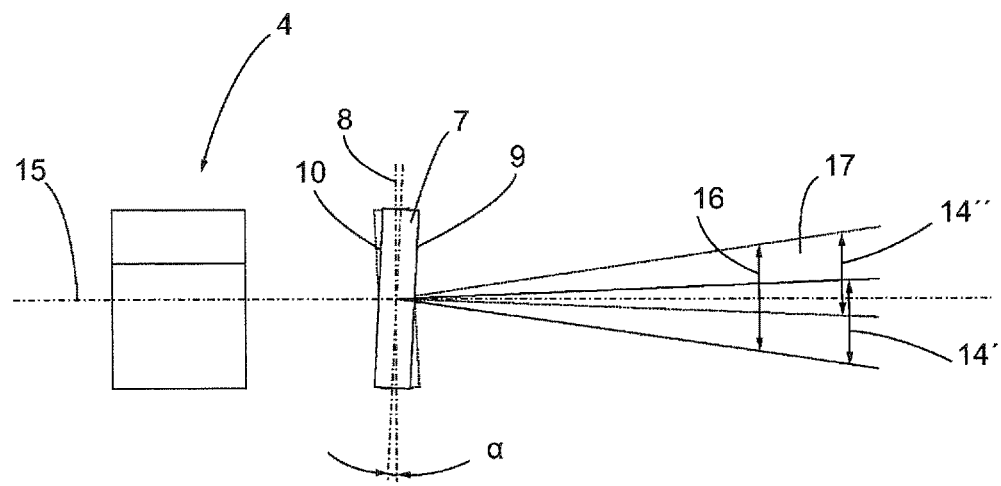
Figure 3:
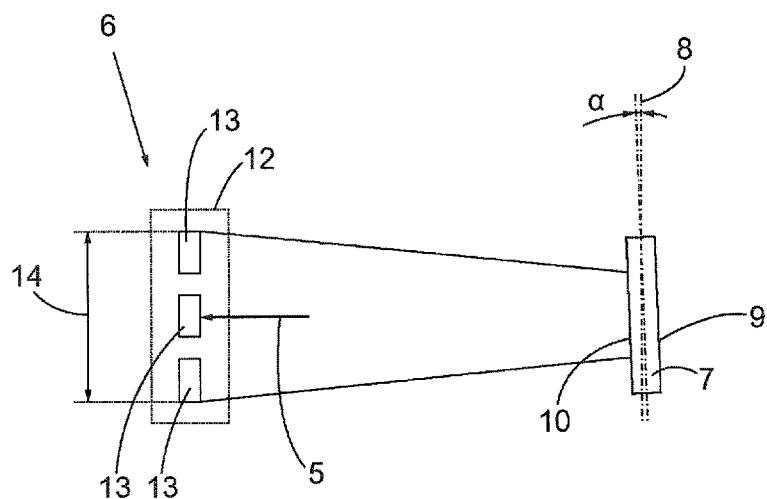

Exemplary embodiments of the invention are explained in more detail below with reference to the drawing, in which:

FIG. 1 shows a side view of a motor vehicle with an opto-electronic detection device, FIG. 2 shows a basic outline of a detection device for a motor vehicle as shown in FIG. 1, FIG. 3 shows a basic outline of an exemplary embodiment of a multiline detector, FIG. 4 shows a schematic illustration of the evaluation of the received signals of the multiline detector shown in FIG. 3, FIG. 5 shows a schematic illustration of the evaluation of the received signals of a further exemplary embodiment of a multiline detector.

FIG. 1 shows the side view of a motor vehicle 1 that has one or more driving assistance systems for assisting the driver that take account of the surroundings of the motor vehicle 1. The driving assistance systems comprise a central computer unit—not shown—and a sensor system supplying the central unit with measurement data. The vehicle sensor system particularly comprises one or more optoelectronic detection devices 2, namely laser scanners. In the exemplary embodiment shown, such a detection device 2 is positioned in the front region of the motor vehicle 1, namely in the region of the radiator grille. In this case, the detection device 2 monitors the surroundings of the motor vehicle 1. It is part of a Lidar system, wherein electromagnetic rays 3 (laser pulses) are transmitted and the light reflected from a target object Z in the surroundings of the motor vehicle 1 (beam 5) is detected.

FIG. 2 and FIG. 3 show the basic design of the detection device 2. The detection device 2 has a transmission and reception optical system 4 that outputs the electromagnetic rays 3 from an optical transmitter—not shown—and maps the reflected rays 5 onto a detector 6 (FIG. 3). The transmission and reception optical system 4 has an associated mirror carrier 7 that can be driven in rotation about an axis of rotation 8 and deflects the transmitted rays 3 onto the scene to be surveyed. The reflected rays 5 are deflected by the mirror carrier 7 to the detector 6. The mirror carrier 7 comprises two mirror faces 9, 10 that are averted from one another and that are situated parallel in the exemplary embodiment shown. During operation of the detection device 2, the mirror carrier 7 is rotated in angular steps, so that scanning of the whole field of view takes place within a particular scanning angle range. For each scanning angle, one laser impulse is transmitted in this case. In the same angular step, the reflected rays 5 are received by means of the detector and corresponding electrical received signals are provided. If echoes, or pulses, are identified in the received signal, they can be attributed to reflections of the transmitted rays 3 from target objects Z in the surroundings. The echo time between transmission and reception of the echo is proportional to the distance from the target object Z. A measurement of the echo time is used to infer the range from the target object Z.

The detection device 2 is of multiline design, that is to say that a plurality of measurement planes are evaluated within a sensing sector 11. For multiline monitoring of the surroundings of the motor vehicle 1, the detector 6 comprises a detector cell stack 12 having a plurality of, three in the exemplary embodiment shown, detector cells 13. The detector cells 13 are avalanche photodiodes, which produce electrical signals when illuminated by reflected rays 5. The detector cells 13 accordingly take the received reflected rays 5 as a basis for producing electrical received signals that are provided for evaluation electronics, not shown.

The transmission and reception optical system 4 is aligned such that the emitted laser beam is mapped at infinity exactly on the map of the detector 6 projected into infinity. The optical sensing region 14 of the detector cell stack 12, in accordance with the strung-together detector cells 13, is therefore deflected via the mirror carrier 7 and projected into the space to be monitored.

The mirror carrier 7 is arranged in a manner tilted at a particular tilt angle α with respect to its axis of rotation 8. The parallel mirror faces 9, 10 are therefore situated in a manner tilted at the tilt angle α with respect to the axis of rotation 8 of the mirror carrier 7, so that the optical sensing region 14 of the detector cell stack 12 is deflected in different directions, or is projected into the surroundings in different sensing regions 14', 14", in accordance with the tilt angle α of the two mirror faces 9, 10. One mirror face 9 is used to deflect reflected rays from a projected sensing region 14' to the detector 6 that is situated offset to one side of an optical axis 15 of the transmission and reception optical system 4 on account of the tilt angle α. In accordance with the tilt angle α, the other mirror face 10 captures a projected sensing region 14" situated on the other side of the optical axis 15. According to the invention, the tilt angle α of the mirror faces 9, 10 is selected such that the projected sensing regions 14', 14" overlap in sections. The tilt angle α is selected such that the sensing regions 14', 14" are mapped onto at least one common detector cell 13 in the detector cell stack 12. The magnitude of the tilt angle α can be determined by empirical ascertainment, particularly by experiments, and is greater the smaller the desired region of intersection in which a high scanning rate is intended to be ensured. In the exemplary embodiment shown, the tilt angle α is approximately 0.3° in harmony with the geometric circumstances that arise from the position of the optical elements of the device, for example the position of the detector cells relative to the mirror carrier 7.

The two sensing regions 14', 14", which are offset from one another on account of the tilted mirror faces 9, 10, allow an extended total sensing region 16, which encloses both projected sensing regions 14', 14", over two successive scanning processes for a full revolution of the mirror carrier 7. In this case, the total sensing region 16 comprises a central section 17 in the region of the optical axis 15, in which central section reflected rays are mapped onto the detector cells 13 via both mirror faces 9, 10 and hence ensure double the scanning rate in comparison with the marginal regions 18 outside the central section 17 in the centre. The centrally situated central section 17, which is particularly important for the sensing of target objects at short range, therefore provides a scanning rate that is high for such applications, such as pedestrian protection.

During evaluation of the received signals of the detector cells 13, the received signals are assigned parallel measurement planes within the sensing regions 14', 14" and the total sensing region 16 is ascertained for two successive scanning processes from the measurement planes of both sensing regions 14', 14". In this case, an appropriate tilt angle α ensures that at least one measurement plane is situated in both sensing regions 14', 14" of the detector 6 in successive scanning processes. The received signals of the detector cells 13 are in this case assigned to respective parallel measurement planes at a height that is dependent on the tilt angle α. In the exemplary embodiment shown, two detector cells 13 are situated in both sensing regions 14', 14", which means that a detector cell 13 is situated in each of the marginal regions 18. In this case, each of the marginal regions 18 contains that detector cell that is situated outside in the series of detector cells 13.

An example of the projection of the three detector cells via the rotating mirror carrier 7 of the detector device 2 of the exemplary embodiment shown in FIG. 2 and FIG. 3 is shown by the evaluation scheme shown in FIG. 4. The left-hand side of the illustration shown in FIG. 4 shows the sensing region 14' for one mirror face 9, each of the three detector cells providing electrical received signals 20, 23, 24. These received signals or the section of the sensing region of the detector cell stack that is represented by the received signals are assigned to parallel measurement planes I, II, III. The second mirror face 10 is used to sense the received signals 20, 21, 22 of the three detector cells in a sensing region 14" that is offset on the basis of the tilt angle and to assign them to corresponding parallel measurement planes. By taking account of the offset position of the sensing regions 14', 14", the measurement signals 20, 21, 22 are assigned to the measurement planes II, III, IV via the second mirror face 10 during the scanning process. During the evaluation of the received signals 20, 21, 22, the parallel measurement planes of both mirror faces 9, 10 are projected in coplanar fashion onto the total sensing region 16, which accordingly comprises all four measurement planes I, II, III, IV. In this case, the central measurement planes 2, 3 are sensed in both scanning processes, which means that there is double the scanning rate in comparison with the marginal regions 17 (FIG. 2), which is characterized by the measurement planes I, IV in the schematic evaluation illustration shown in FIG. 4.

In an exemplary embodiment that is not shown, the sensing regions intersect on the basis of a corresponding tilt angle for the mirror faces via a common measurement plane or map of a detector cell. In this case, the detector device has a larger total sensing region than the exemplary embodiment with two measurement planes in the intersecting central section, the latter exemplary embodiment affording the advantage of a larger central section with an increased scanning rate.

The power of a radiation source is distributed over just three cells, which means that there is a high power balance for the detection device and hence a long range is achieved. Nevertheless, the tilt angle according to the invention such that the sensing regions 14', 14" of both mirror faces 9, 10 partially overlap in a central section 17 provides a total sensing region 16 having four parallel measurement planes I, II, III, IV. In other words, the sensing region of the detector cells 13, which may correspond to a sensing sector of 2.4°, is increased by approximately one third to a sensing region of 3.2° without altering the power balance.

FIG. 5 shows a graphical representation of the evaluation scheme of a further exemplary embodiment of a detection device, whose detector cell stack, in contrast to the exemplary embodiment shown in FIG. 3, comprises six detector cells 13. The detector cells are arranged at intervals within the detector cell stack to form intermediate spaces, so that the detector cell stack can cover a large sensing region with a comparatively small number of detector cells. In this case, the left-hand side of the illustration shows the sensing region 14''' that is mapped onto the detector with six detector cells by one mirror face 9 of the mirror carrier. The right-hand side shows the sensing region 14'''' of the detector via the second mirror face 10. In accordance with the arrangement of the detector cells at intervals, each sensing region 14''', 14'''' rejects intermediate spaces 23 between the regions that are sensed by single detector cells and for which there are received signals in respective measurement planes.

In order to close gaps during the evaluation of the received signals, which gaps arise as a result of the intervals 23 between the detector cells 13 during illumination by one mirror face 9, the tilt angle α of the mirror carrier 7 (FIG. 2) is determined such that the other mirror face 10 covers the detector cells in the intermediate spaces 23. In the exemplary embodiment with parallel mirror faces 9, 10 on the mirror carrier 7, the tilt angle is determined such that each mirror face 9, 10 maps the detector cells 13 in the intermediate spaces 23 of the map of the respective other mirror face 9, 10. Intervals 23 between the detector cells 13 allow significant enlargement of the vertical sensing region of the detection device, with the optical gaps in the respective scanning regions of both mirror faces 9, 10 being closed by the tilting of the mirror carrier 7. In the example shown in FIG. 5, the detector cells are arranged at an interval that the vertical gaps in the sensing region are approximately 50% of the vertical extent of the active faces of the detector cells 13.

LIST OF REFERENCE SYMBOLS

1 Motor vehicle
2 Detection device
3 Rays
4 Transmission and reception optical system
5 Reflected rays
6 Detector
7 Mirror carrier
8 Axis of rotation
9 Mirror face
10 Mirror face
11 Sensing sector
12 Detector cell stack
13 Detector cell
14 Optical sensing region
14', 14", 14''', 14'''' Sensing region
15 Optical axis
16 Total sensing region
17 Central section
18 Marginal region
19
20 Received signal
21 Received signal
22 Received signal
23 Intermediate space
I Measurement plane
II Measurement plane
III Measurement plane
IV Measurement plane
α Tilt angle

The invention claimed is:

1. A scanning opto-electronic detection device comprising a laser scanner for a motor vehicle, the detection device comprising:

a transmission and reception optical system that outputs electromagnetic rays and maps rays that are reflected from a target object in surroundings of the motor vehicle onto a detector; and a mirror carrier configured to be driven in rotation and that, for the purpose of deflecting the transmitted rays and the reflected rays, is associated with the transmission and reception optical system and has mirror faces that are remote from one another, wherein the detector is of multiline design and comprises a plurality of detector cells for providing electrical received signals on the basis of received reflected rays, said detector cells being lined up in a detector cell stack and being evaluable in parallel measurement planes, wherein the mirror faces are arranged in a manner tilted only by a tilt angle with respect to an axis of rotation of the mirror carrier and map different vertical sensing regions for reflected rays onto the detector, wherein tilt angles for the mirror faces are such that the sensing regions partially overlap in at least one section of a total sensing region.

2. The detection device according to claim 1, wherein each of the mirror faces is arranged at particular tilt angles with respect to the axis of rotation of the mirror carrier.

3. The detection device according to claim 2, wherein the mirror faces are situated parallel and the mirror carrier is arranged at a tilt angle with respect to its axis of rotation.

4. The detection device according to claim 1, wherein the tilt angles of the mirror faces are such that the sensing regions are mapped onto at least one common detector cell.

5. The detection device according to claim 1, wherein the detector cells are arranged at intervals from one another to form intermediate spaces, wherein the mirror faces are arranged at a tilt angle that is such that each mirror face maps the detector cells in the intermediate spaces of the mapping of the respective other mirror face.

6. A method for sensing the surroundings of a motor vehicle by scanning by means of an opto-electronic detection device comprising a laser scanner, the method comprising:
   outputting, by a transmission and reception optical system, electromagnetic rays; and
   mapping, by the transmission and reception optical system, rays reflected from a target object in surroundings of the motor vehicle onto a multiline detector having a plurality of detector cells lined up in a detector cell stack,
   wherein a rotating mirror carrier having mirror faces that are averted from one another and tilted at particular tilt angles in relation to an axis of rotation of the mirror carrier deflects transmitted rays onto the scene to be surveyed and/or reflected rays to the transmission and reception optical system and determines different vertical sensing regions of the detector in accordance with the tilt angles,
   wherein the detector cells take the received rays as a basis for producing electrical received signals that are assigned to parallel measurement planes within the sensing regions of the detector, and
   wherein from the measurement planes of both sensing regions a total sensing region is ascertained for two successive scanning processes with the respective mirror faces, wherein
   the mirror faces are set, and deflect rays, at tilt angles with respect to the axis of rotation are such that the sensing regions partially overlap.

7. The method according to claim 6, wherein the received signals of the detector cells are assigned to respective sensing regions of the mirror faces.

8. The method according to claim 6, wherein the received signals of the detector cells are each assigned, during the scanning processes of both mirror faces, to parallel measurement planes at a height that is dependent on the tilt angle, and the parallel measurement planes of two successive scanning processes are projected onto the total sensing region in coplanar fashion.

* * * * *